United States Patent

Yano et al.

[11] 4,037,933
[45] July 26, 1977

[54] LIGHT DEFLECTOR OF ACOUSTO-OPTIC INTERACTION TYPE

[75] Inventors: Tsutomu Yano; Koetsu Saito; Kuniaki Fukaya, all of Kawasaki; Akinori Watanabe, Komae, all of Japan

[73] Assignee: Matsushita Electric Industrial Co., Ltd., Osaka, Japan

[21] Appl. No.: 637,702

[22] Filed: Dec. 4, 1975

[30] Foreign Application Priority Data

Dec. 9, 1974 Japan .................. 49-141793

[51] Int. Cl.² .............................................. G02F 1/16
[52] U.S. Cl. ................................................ 350/161 W
[58] Field of Search .......................................... 350/161

[56] References Cited

U.S. PATENT DOCUMENTS

| 2,418,964 | 4/1947 | Arenberg | 350/161 |
| 3,637,288 | 1/1972 | Seidel | 350/161 |
| 3,665,204 | 5/1972 | Nelson | 350/161 |

Primary Examiner—William L. Sikes
Attorney, Agent, or Firm—Stevens, Davis, Miller & Mosher

[57] ABSTRACT

A light deflector utilizing the anisotropic Bragg diffraction in an anisotropic medium in which the directions of the wave front normal and the energy propagation of ultrasonic waves are arranged to be different and the frequency range of the ultrasonic wave for causing re-diffraction of light diffracted once by said ultrasonic wave is set outside the driving frequency range. The diffraction efficiency does not fall near the central frequency of the driving ultrasonic frequency range due to the prevention of rediffraction. Further, the driving frequency can be selected over a remarkably wide range compared to that of the conventional light deflector.

4 Claims, 14 Drawing Figures

LIGHT DEFLECTOR OF ACOUSTO-OPTIC INTERACTION TYPE

This invention relates to light deflection utilizing the acousto-optic effect, and more particularly to a light deflector of extremely wide band width and good frequency characteristics having high diffraction efficiency over an extremely wide frequency range.

Conventionally, two methods, i.e., the beam steering method using high frequency ultrasonic waves and the method utilizing the anisotropic Bragg diffraction in an anisotropic medium, have been known as the principle means for obtaining an acousto-optic light deflector having a wide band width.

According to the beam steering method, a piezoelectric transducer affixed to an acousto-optic medium is divided into several sections along the propagation direction of the light. The effective acoustic wave front in the medium is varied with the frequency by varying the phase of the acoustic wave applied to the respective sections or forming the contact surface in stepwise form and changing the phase of the acoustic waves for the respective sections. Accordingly, the diffraction condition can be always satisfied for the incident light so as to achieve a wide band width. Such a method, however, is accompanied by difficulties in manufacture.

Regarding the light deflector utilizing the anisotropic Bragg diffraction, Warner of Bell Laboratory, U.S.A. reported in 1972 a light deflector of extremely high efficiency and wide band width utilizing the optical activity of tellurium dioxide ($TeO_2$) single crystal. This, however, was also accompanied by various problems, mainly related to maximum diffraction efficiency and the decrease in the diffraction efficiency around the central frequency.

An object of this invention is to provide a light deflector free from the conventional drawbacks and having an excellent frequency characteristic with no decrease in the diffraction efficiency near the central frequency in the anisotropic Bragg diffraction.

Another object of this invention is to provide a light deflector of the anisotropic Bragg diffraction type having a wider drivable frequency range than that of the conventional light deflector.

A further object of this invention is to provide a convenient light deflector capable of using almost linearly polarized light as the incident light.

According to one aspect of this invention, there is provided a light deflector, utilizing the anisotropic Bragg diffraction of light by acoustic waves in an anisotropic crystal comprising an acousto-optic medium formed of an anisotropic crystal having light incident and exit surfaces and an acoustic wave incident surface, and a piezoelectric transducer disposed on the acoustic wave incident surface, the surfaces of the acousto-optic medium being so arranged that the directions of the wave front normal and the energy propagation of the ultrasonic wave are made different.

Hereinbelow, description will be made in conjunction with the accompanying drawings, in which.

Figure 1:
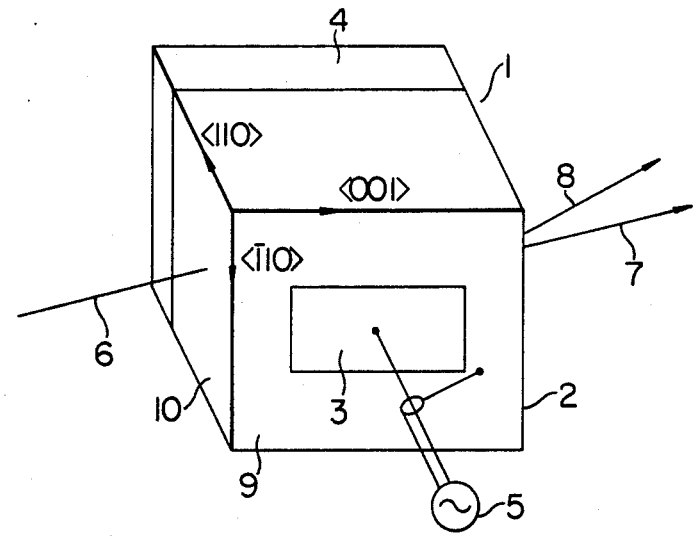
FIG. 1 is a schematic diagram illustrating a conventional $TeO_2$ light deflector.

First of all, the light deflector proposed by Warner will be described in connection with FIG. 1. FIG. 1 shows a light deflector 1 comprising a single crystal body of tellurium dioxide 2 and a piezoelectric transducer 3 adhered to the (110) surface 9 of the tellurium dioxide body 2. Transverse ultrasonic waves propagating along the $<110>$ axis and having a displacement direction along the $<\bar{1}10>$ axis is applied to the $TeO_2$ crystal 2 through the transducer 3. The incident light ray 6 is formed of clockwise gyrating elliptically polarized light, injected into the crystal at an angle slightly slanted from the optic axis, $<001>$ axis, and subjected to light diffraction by the transverse ultrasonic wave generated by the transducer 5 to form a diffracted light ray 8. Residual or undiffracted light is shown at numeral 7. An acoustic absorber 4 is provided on the other side of the crystal 2 to the piezoelectric transducer 3.

Figure 2:
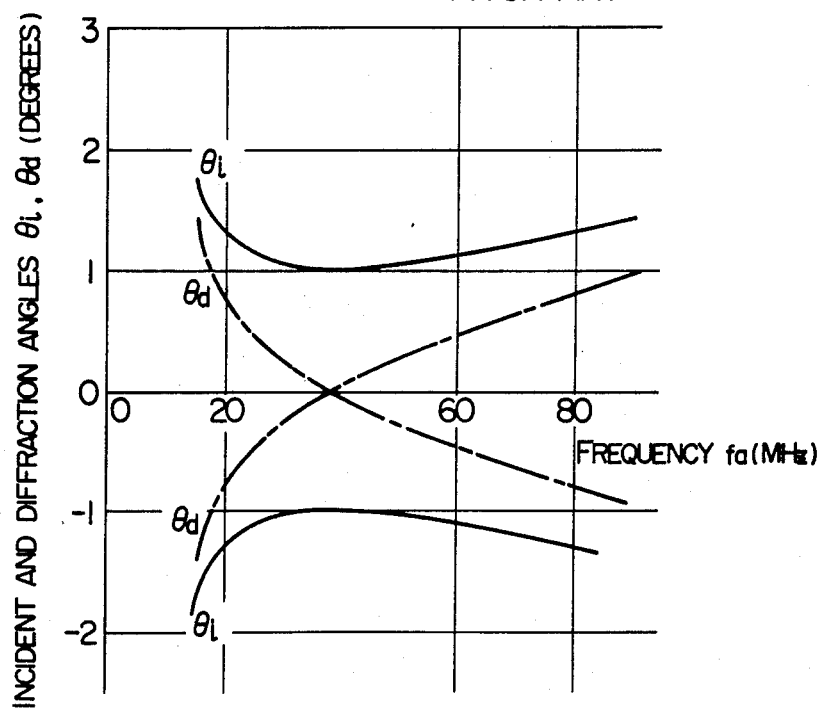
FIG. 2 is a characteristic diagram showing the relation between the incident and diffracted angles and the frequency in the conventional $TeO_2$ light deflector.

The relation between the incident angle $\theta_i$ in the crystal and the frequency $f_i$ of the ultrasonic wave in the case of using a He - Ne laser light of a wavelength 6328 A as the incident light in the system of FIG. 1 is shown in FIG. 2. Here, the letter $\theta_d$ denotes the diffraction angle.

Two main factors for limiting the frequency range of the light deflector of an acousto-optic light modulator are 1. band limitation $\Delta f_B$ by the deviation from the diffraction condition with varying frequency, and
2. band limitation $\Delta f_T$ by the frequency dependence of ultrasonic power due to the insertion loss of the piezoelectric transducer 3.

In the case of a $TeO_2$ light deflector and of an X-cut plate of $LiNbO_3$ as the piezoelectric transducer 3, the band limitation $\Delta f_T$ by the piezoelectric transducer 3 due to the latter term (2) is about 0.7 as large as the anti-resonance frequency $f_R$ of the piezoelectric transducer 3. On the other hand, the band limitation $\Delta f_B$ due to the frequency deviation from the diffraction condition due to the former term (1) can be obtained from the diffraction angle $\Delta\theta_a$ (about 3dB) of the acoustic wave the relationship from $$\Delta\theta_a = 0.9 \, v/f_a \cdot L \qquad (1)$$

where $v$ is the sound velocity in the medium, and L is the transducer length. In the frequency range in which the incident angle is at the minimum in FIG. 2, the incident angle satisfying the diffraction condition changes little even when the frequency is changed. Thus, a wide band light deflector is provided by setting the incident angle at or in the neighborhood of $\theta_m + (\Delta\theta_a/2$, where $\theta_m$ is the minimum incident angle.

Figure 3:
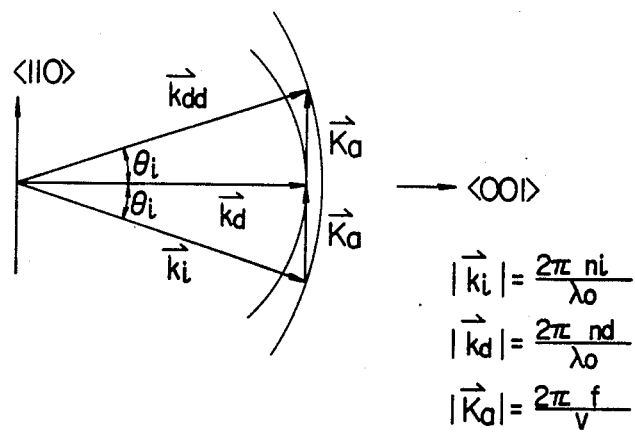
FIG. 3 is a diagram illustrating the relation of wave vectors in the case of the conventional $TeO_2$ light deflector.

At frequencies where the incident angle becomes smallest, as can be seen from the wave vector relation of FIG. 3, the incident light $\vec{k_i}$ is diffracted by the transverse ultrasonic wave $\vec{K_a}$ and generates a diffracted light $\vec{k_d}$ which satisfies the relation $\vec{k_i} + \vec{K_a} = \vec{k_d}$ but the angle formed by $\vec{k_d}$ and $\vec{K_a}$ is a right angle. Thus the light once diffracted, $\vec{k_d}$, may be diffracted again when the condition $\vec{k_d} + \vec{K_a} = \vec{K_{dd}}$ is satisfied. As a result, a doubly diffracted (rediffracted) light ray $\vec{k_{dd}}$ is generated on the opposite side to the incident light $\vec{k_i}$.

In the conventional light deflector, the frequency $f_{dd}$ for generating the rediffraction is expressed as $$f_{dd} = (v/\lambda) \sqrt{n_i^2 - n_d^2}$$

where $\lambda$ is the wavelength of the incident light in vacuum, and $n_i$ and $n_d$ are refractive indices of the medium for the incident and the diffracted light. Practically, the rediffraction frequency $f_{dd}$ for the light of a wavelength 6328 A is about 38 MHz.

Figure 4:
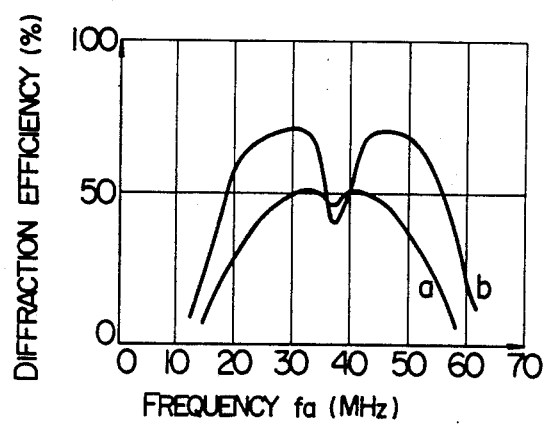
FIG. 4 is a diagram showing the frequency dependence of the diffraction efficiency.

Thus, the frequency dependence of the diffraction efficiency becomes as shown by curve $a$ in FIG. 4; the decrease of the diffraction efficiency at rediffraction frequency appears beyond the efficiency of 40%.

The maximum diffraction efficiency within 3dB frequency band width is depressed at about 70% as shown by curve $b$ in FIG. 4 and further the decrease at the central frequency becomes serious.

This phenomenon is not limited to the case of tellurium dioxide but also occurs in the anisotropic Bragg diffraction in orhter anisotropic media, and has been one of the largest problems and disadvantages of the anisotropic Bragg diffraction type light deflectors.

Further, unless a clockwise gyrating elliptically polarized light with an ellipticity of about 0.8 is used as the incident light of the light deflector, the effective polarization component decreases and the diffraction efficiency falls. Thus, for using a laser light which is generally linearly polarized, such optical parts as a $\lambda/4$ plate for transforming a linearly polarized light into an elliptically polarized light is required.

The purpose of the present invention is to improve the above light deflector and solve the drawbacks described above. Although this invention is not limited to a light deflector using a TeO$_2$ crystal, the following description will relate to embodiments using a TeO$_2$ crystal in which the effect is extremely large.

Figure 5:
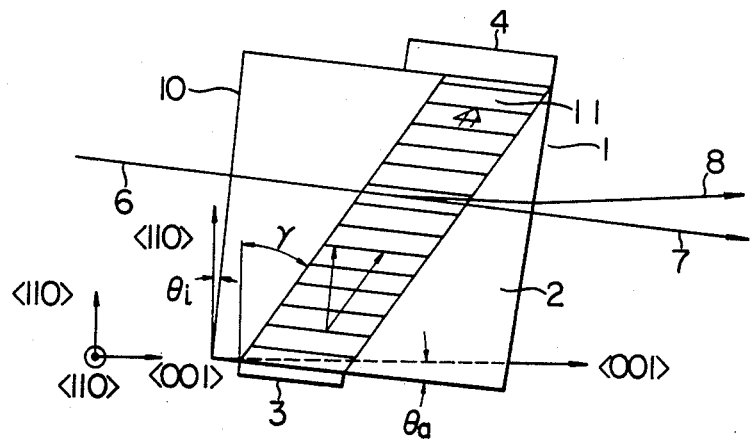
FIG. 5 is a cross-sectional diagram illustrating an embodiment of a light deflector according to this invention.

FIG. 5 shows an embodiment of a light deflector 1 in which a piezoelectric transducer 3 is affixed to a surface which is inclined by an angle $\theta_a$ from the (110) plane of a TeO$_2$ crystal 2. Thus, the normal direction to the wave front and the energy propagation direction of an acoustic wave 11 becomes much different (angle of $\gamma - \theta_a$ formed between two directions). An acoustic absorber 4 is affixed to the side of the TeO$_2$ crystal 2 opposite the surface on which the piezoelectric transducer 3 is secured. An incident light ray 6 is incident on a surface 10 which is inclined by an angle $\theta_i$, and an undiffracted light ray 7 and a diffracted light ray 8 are generated from the incident light through interaction with the acoustic wave 11.

Figure 6:
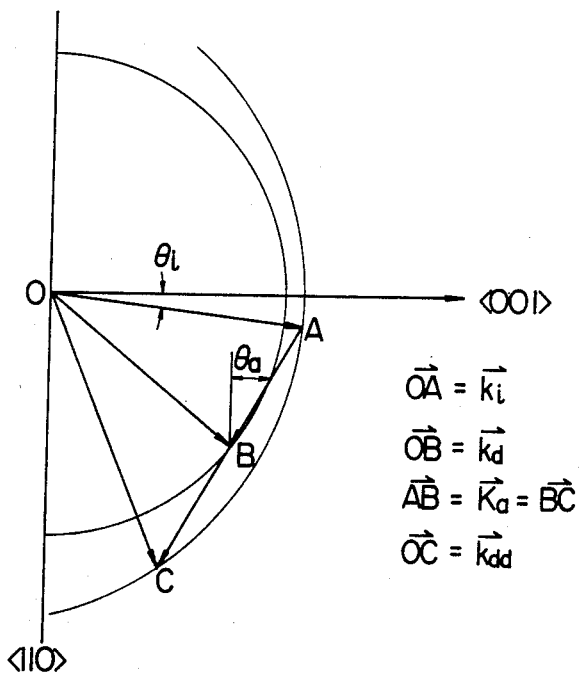
FIG. 6 is a diagram showing the relation of wave vectors in the case of the light deflector according to this invention.

In this case, the relation of the wave vectors of the acoustic wave 11, the incident light ray 6 and the diffracted light ray 8 is as shown in FIG. 6. The wave vector of the acoustic wave $\vec{K_a}$ is no longer parallel to the $<110>$ axis and is represented by an arrow $\vec{AB}$ or $\vec{BC}$ and that of the incident light $\vec{k_i}$ is slanted by an angle $\theta_i$ from the $<001>$ axis and represented by an arrow $\vec{OA}$. The wave vector of the diffracted wave $\vec{k_d}$ is represented by $\vec{k_d} = \vec{k_i} + \vec{K_a} = \vec{OA} + \vec{AB} = \vec{OB}$.

The relation of the incident angle (the angle formed between the propagation direction of light and the $<001>$ axis) and the frequency can be calculated by a computer process based on the following equations (2) to (6).

$$n_1 \sin\theta_1 - n_2 \sin\theta_2 = f_a \lambda \cos\theta_a/v(\theta_a) \qquad (2),$$
$$n_1 \cos\theta_1 - n_2 \cos\theta_2 = -f_a \lambda \sin\theta_a/v(\theta_a) \qquad (3),$$
$$n_1^2 = n_o^2 n_e^2 (1 + \delta)^2/(n_e^2 \theta_1 + n_o^2 \sin^2\theta_1) \qquad (4),$$
$$n_2^2 = n_o^2 (1 - \delta)^2/\{\cos^2\theta_2 + (1 - \delta)^2 \sin^2\theta_2\} \qquad (5),$$
$$v(\theta_a) = [\{(C_{11} - C_{12})\cos^2\theta_a/2 + C_{44}\sin^2\theta_a\}/\rho]^{\frac{1}{2}} \qquad (6),$$

where $n_1$ and $n_2$ are refractive indices for the incident and diffracted lights, $n_o$ and $n_e$ refractive indices for the ordinary and extraordinary light rays propagating along the $<110>$ axis, $\delta$ the gyration constant, $C_{11}$, $C_{12}$ and $C_{44}$ eleastic constants according to the usual notation, $f_a$ the frequency of the ultrasonic wave, $\lambda$ the wavelength of light in the vacuum, $v(\theta_a)$ the phase velocity of the accoustic wave when the normal direction of the wave front of the transverse acoustic wave is inclined by $\theta_a$ from the $<110>$ axis toward the $<001>$ axis, and $\rho$ the density of the acousto-optic material.

Figure 7:
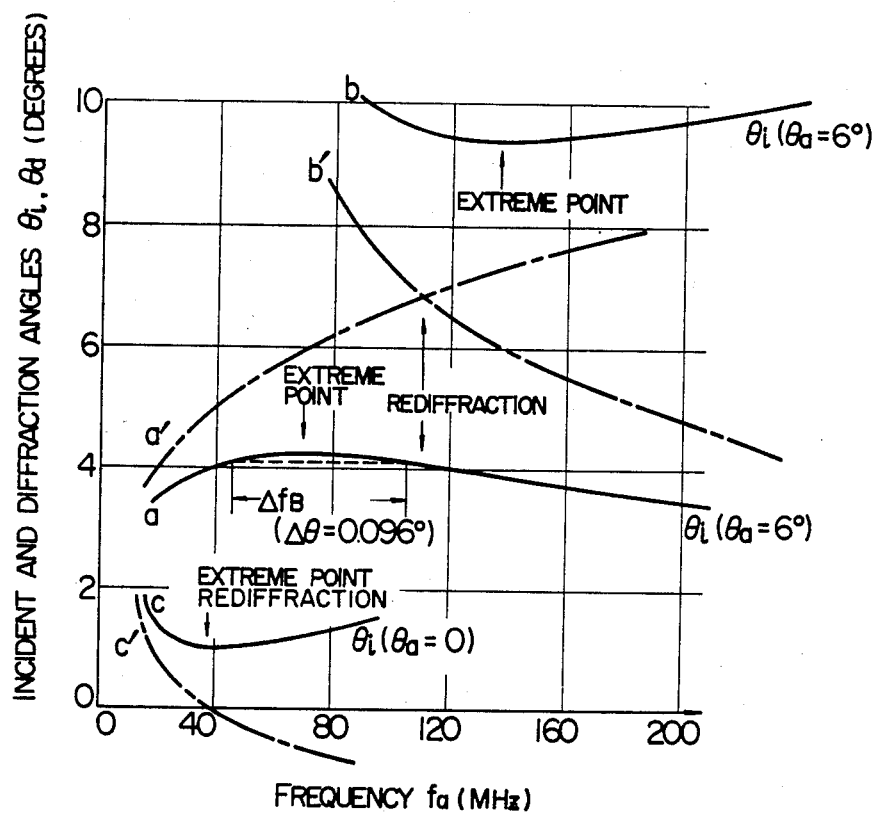
FIGS. 7 and 8 are characteristic diagrams showing the relation of the incident and diffracted angles and the frequency.
Figure 8:
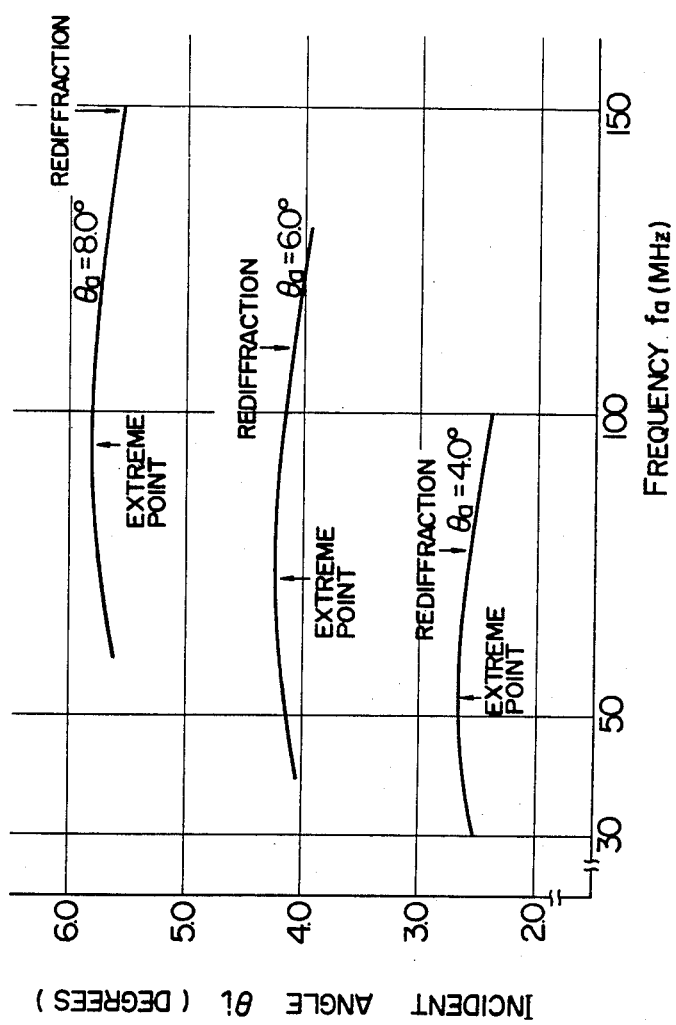

The results of calculation are shown in FIGS. 7 and 8. FIG. 7 shows the relation among the incident and the diffracted angles and the frequency in the case of using light of a wavelength $\lambda = 6328$ A and setting $\theta_a$ at 6°.

In FIG. 7, curves $a$ and $b$ represent the relation between the incident angle $\theta_i$ and the frequency i $f_1$, curves $a'$ and $b'$ the relation between the diffracted angle $\theta_d$ and the frequency $f_a$ corresponding to the curves $a$ and $b$, respectively, and curves $c$ and $c'$ the relation among the incident angle $\theta_i$, the diffraction angle $\theta_d$ and the frequency $f_a$ when the angle $\theta_a$ is set at zero, i.e., the propagation direction of the acoustic wave is set along the $<110>$ axis. In the case of $\theta_a = 6°$, the frequency for causing rediffraction is at about 111 MHz and the extreme point of curve $a$, i.e., the frequency at which the differential of the incident angle with respect to the frequency $(\theta/f_a)$ becomes equal to zero, occurs at 70 MHz. Thus, when the length L of the piezoelectric transducer 3 is 5 mm, the diffraction angle of the acoustic wave $\Delta\theta_a$ is about 0.096° from the relation $\Delta\theta_a = 0.9 \, v/fL$ and the frequency band width $\Delta f_B$ of the light deflector corresponding to this angle becomes about 55 MHz (from 47 to 102 MHz). It is noted that the frequency for causing rediffraction is about 111 MHz and outside the above range, and hence no decrease in the frequency dependence of the diffraction efficiency occurs and good characteristics can be obtained. Practically, it is more effective to set the angle of light incidence within one degree in the neighborhood of the angle at which the differential $d\theta/df$ becomes zero.

On the other hand according to the conventional method, the extreme point and the frequency of rediffraction coincide and this frequency is low, about 38 MHz. In this case, the band width $\Delta f_T$ for the piezoelectric transducer 3 is about $0.7 \, f_R$ and of the order of 26

MHz since the anti-resonance frequency $f_R$ of the piezoelectric transducer 3 is set in the neighborhood of the extreme point. When the length L in which the interaction between the light and the ultrasonic wave occurs is set to be 5 mm, the band width due to the deviation from the diffraction condition becomes about 41 MHz. Since this band width is wider than 26 MHz which is limited by the band width $\Delta f_I$ from the piezoelectric transducer 3, the actual band width becomes narrower than 26 MHz.

According to the present embodiment, however, there is provided an advantage that the band width becomes wide since $\Delta f_B$ is 55 MHz and $\Delta f_T$ is 49 MHz.

FIG. 8 shows the characteristics when the angle $\theta_a$ formed by the surface on which the piezoelectric transducer 3 is affixed and the (110) plane is varied. As the angle $\theta_a$ becomes large, the frequency of the extreme point and the rediffraction become large. Further, the frequency difference between the frequencies of the extreme point and the rediffraction also becomes large. Therefore, the frequency of rediffraction goes further outside of the band. Therefore, it is possible to make a light modulator or a light deflector having a wider band and higher response speed by increasing $\theta_a$. Further, according to the light deflector of this invention, since a light ray propagates in a crystal almost as a linearly polarized light, there is no need for the incident light beam to transform a laser light into an elliptically polarized light by a $\lambda/4$ plate, etc., as required for the conventional light deflector. This brings the advantages of reduction of the surface reflection of light, easy alignment of the optic axis, etc.

Figure 9:
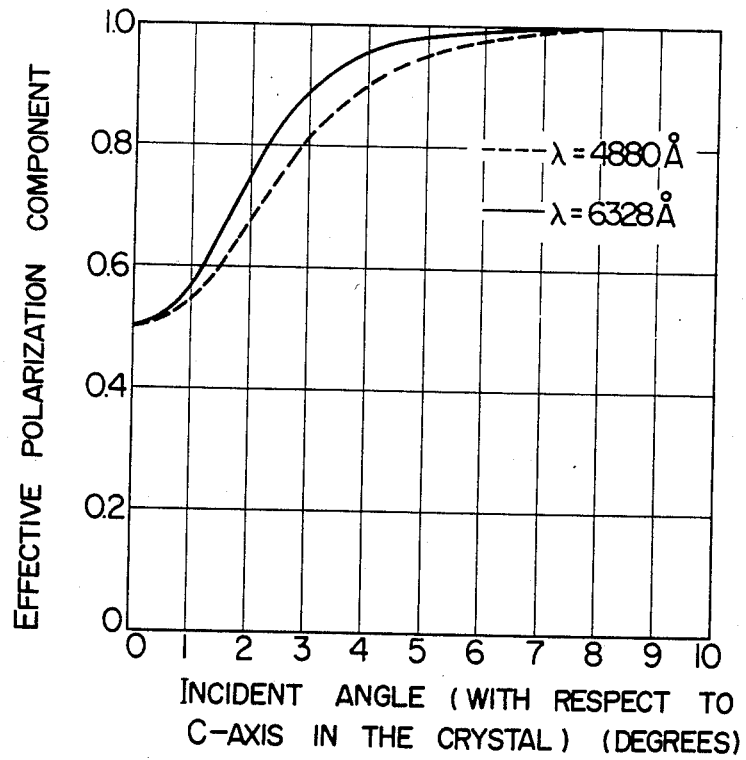
FIG. 9 is a diagram showing the relation of the effective polarization component and the incident angle.

FIG. 9 shows the dependence of the effective polarization component on the angle formed by the propagation direction of the incident light and the c-axis in the crystal. The effective polarization component is the component effectively diffracted in the crystal when a linearly polarized light having a polarization direction along the < 110 > direction outside the crystal (the polarization corresponding to the extraordinary ray in the crystal) is injected into the crystal. For example, if the angle $\theta_a$ is set above 6°, the angle of incidence at which the extreme point occurs in the crystal is above 4°. From FIG. 9, above 96% of the incident light at $\lambda$ = 6328 A and above 90% even at $\lambda$ = 4880 A can be utilized for the diffraction.

This should be compared with the face that according to the conventional case of utilizing an elliptically polarized light (ellipticity of the order of about 0.9) a plurality of phase plates should be used and the light loss in this case exceeds 10%. It will be apparent that the incident light can be exceedingly effectively utilized according to this invention.

Figure 10:
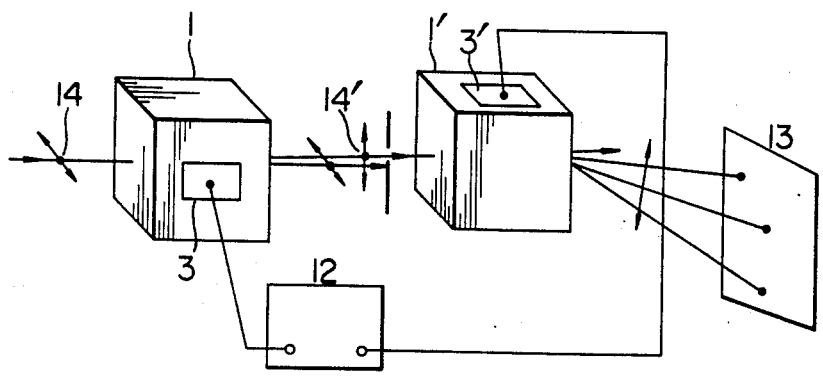
FIG. 10 is a perspective diagram showing an application of this invention.

Further, it is very advantageous that when a pair of light deflectors 1 and 1' are assembled in series to achieve two dimensional deflection, there is no need for the use of optical phase plates. As shown in FIG. 10, the diffracted beam from the former stage has a phase $\pi$-rotated from that of the incident light and is incident on the light deflector of the latter stage as the extraordinary ray. Thus, there is also no need for phase plates, etc., between the former and the latter stage. Light reflection is naturally very small. In FIG. 10, piezoelectric transducers 3 and 3' are affixed on the two TeO$_2$ crystals and driven by a power source 12. The polarizations of the light are represented by arrows 14 and 14', and the deflected light ray is scanned on a screen 13.

Figure 11:
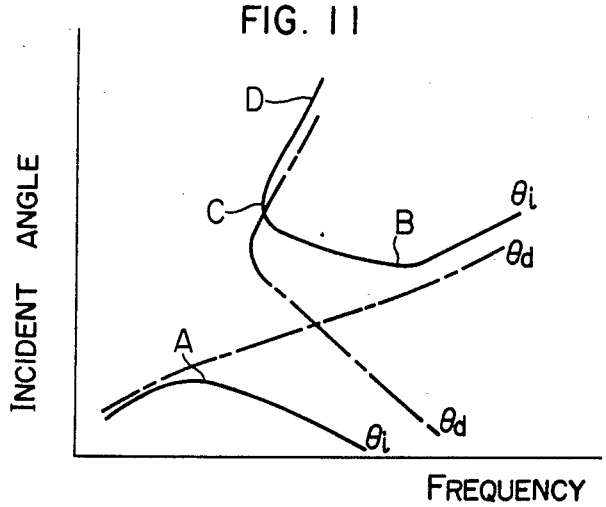
FIG. 11 is a characteristic diagram showing the relation between the incident angle and the frequency.

On the other hand, acousto-optic filters using a tellurium dioxide crystal in which the directions of the acoustic wave front normal and the propagation of the acoustic energy are made different as is the case of the present invention were previously reported in: 1974 Spring Meeting of the Japan Society of Applied Physics (Speech No. 3aA4), and I.C. Chang, Applied Physics Letters, Vol. 25, No. 7, 1974. These two methods, however, use such incident angle and frequency as shown by C or D in FIG. 11 and do not refer to points in regions A and B.

In the regions C and D, the angle formed by the propagation direction of light in the crystal and the < 001 > axis is above 10°, whereas the angle according to this invention is less than 10°. Further, another significant difference between the acousto-optic filters and the present light deflector is that, in the acousto-optic filter, the larger the differential of the incident angle with respect to the frequency $| d\theta/df |$ the better since the larger value provides the narrower spectral width as an acousto-optic filter. Thus, regions C and/or D were used in said acousto-optic filters.

On the other hand, in a light deflector smaller the value of $| d\theta/df |$ the better. Regions such as A or B are fitted for providing a wide driving frequency band.

As has been described above, the light deflector according to this invention provides such features that 1. it has a good frequency characteristic which is free from the fall of the diffraction efficiency in the driving frequency band,
2. it is a wide band light deflector since the central frequency can be set high,
3. it can use a linearly polarized light as the incident light and does not need the use of phase plates,
4. an arbitrary central frequency can be selected by changing $\theta_a$, and
5. it can be driven by a small power due to the of a tellurium dioxide single crystal having an extremely high diffraction efficiency as the light deflecting medium.

More particularly, the following features are obtained by the present invention.

1. The directions of the normal of the acoustic wave front and the propagation of energy are largely different. In TeO$_2$ crystal, for example, the difference is about 20° at $\theta_a$ = 2° and about 45° at $\theta_a$ = 6°. Thus, the shapes of the acoustic absorber and the deflecting medium are only needed to prevent the acoustic wave from striking the light emerging surface.
2. The acoustic velocity becomes faster as the normal of the acoustic wave front is shifted from the < 110 > axis, for example 1.056 times as fast at $\theta_a$ = 6°. Thus, although the acousto-optic figure of merit becomes about 15% less, yet the power required for 100% diffraction is of the order of several hundred milliwatts.

Next, other embodiments of this invention will be described briefly.

EMBODIMENT 2

Similar to the embodiment 1, tellurium dioxide crystal is used as the medium, but the characteristic curve b of FIG. 7 is used in place of the curve a. In this case, the frequencies of the extreme point and the rediffraction are also different (although the extreme point lies at a higher frequency point than that of the rediffraction) and hence a light deflector of wide band and free from the fall of diffraction efficiency can be obtained.

EMBODIMENT 3

Figure 12:
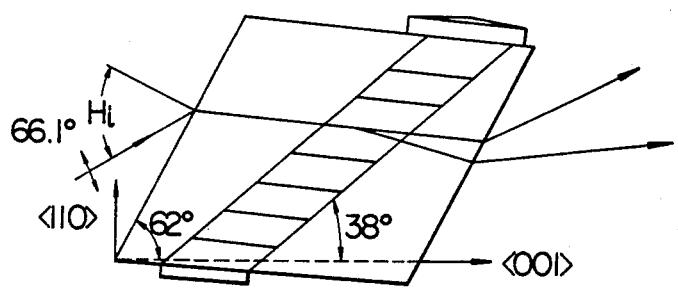
FIG. 12 is a cross-sectional diagram illustrating another embodiment of the light deflector according to this invention.

The incident plane is inclined (oblique incidence) as shown in FIG. 12 to achieve the Brewster angle incidence and the angle formed by the propagation direction of light in the crystal and the $<001>$ axis is brought at or in the neighborhood of the angle at which an extreme occurs. Reflection of light can be minimized by this arrangement.

EMBODIMENT 4

Figure 13:
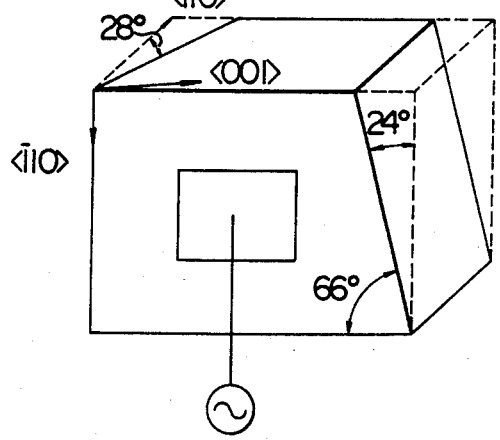
FIG. 13 is a perspective diagram illustrating another embodiment of the light deflector according to this invention.

As is shown in FIG. 13, the exit surface is slanted from the c-plane to the $<110>$ axis. Reflection of light at the exit surface is almost nullified so that a light deflector almost free from the reflection loss of light can be obtained.

EMBODIMENT 5

In the arrangements of the foregoing embodiments 1 to 4, anisotropic crystals of $LiNbO_3$, $PbMoO_4$, $CaMoO_4$, $HIO_3$, etc., are used in place of the $TeO_2$ single crystal as the acousto-optic medium. Similar effects can be obtained in these cases, too.

Figure 14:
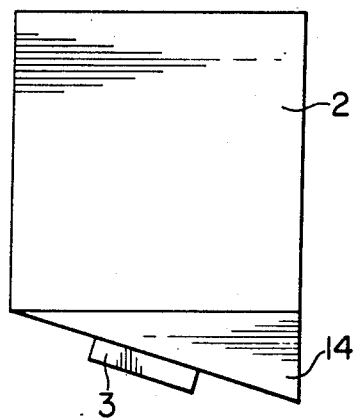
FIG. 14 is a diagram illustrating another embodiment of the light deflector according to this invention.

For displacing the normal of the acoustic wave front from the $<110>$ axis, the wave front to be provided with a piezoelectric transducer was inclined from the (110) plane in the foregoing embodiments. In place of this arrangement, an intermediate acoustic wave transmitter medium 14 having a wedge shape is inserted between the piezoelectric transducer and the deflecting medium 2 as shown in FIG. 14. This arrangement provides effects similar to those of slanting the surface on which the piezoelectric transducer 3 is secured.

As has been described above, this invention provides a light deflector utilizing the anisotropic Bragg diffraction. There occurs no fall of the diffraction efficiency in the neighborhood of the central frequency and an excellent frequency characteristic can be obtained. Further, there are provided other advantages such that the driving band width can be wide, and almost linearly polarized light can be used as the incident light, etc.

We claim:

1. A light deflector for deflecting an incident beam of light through a predetermined angle comprising:
    an acousto-optic medium formed of an anisotropic crystal having light incidence and exit surfaces and an acoustic wave incidence surface, said light incidence surface being inclined with respect to the (001) plane of said crystal at an angle which is less than 10°, and said acoustic wave incidence surface being inclined with respect to the (110) plane of said crystal, and
    an ultrasonic wave source affixed to said acoustic wave incidence surface for propagating an ultrasonic energy wavefront in said crystal, the direction of the normal to said wavefront being different from the direction of ultrasonic energy propagation in said crystal.

2. A light deflector as defined by claim 1, wherein the incident angle $\theta$ of the light beam and the frequency of the ultrasonic energy $f$ are such that the frequency differential $|d\theta/df|$ is substantially zero.

3. A light deflector according to claim 1, wherein said acousto-optic medium is a paratellurite crystal.

4. A light deflector according to claim 3, in which a wedge-shaped intermediate medium is inserted between the (110) surface of the crystal medium and the ultrasonic wave source means so as to form an inclined structure therewith.

* * * * *